July 15, 1924.  1,501,651
H. FERGUSON
AGRICULTURAL IMPLEMENT
Filed May 4, 1922  2 Sheets-Sheet 1
Fig. 1.
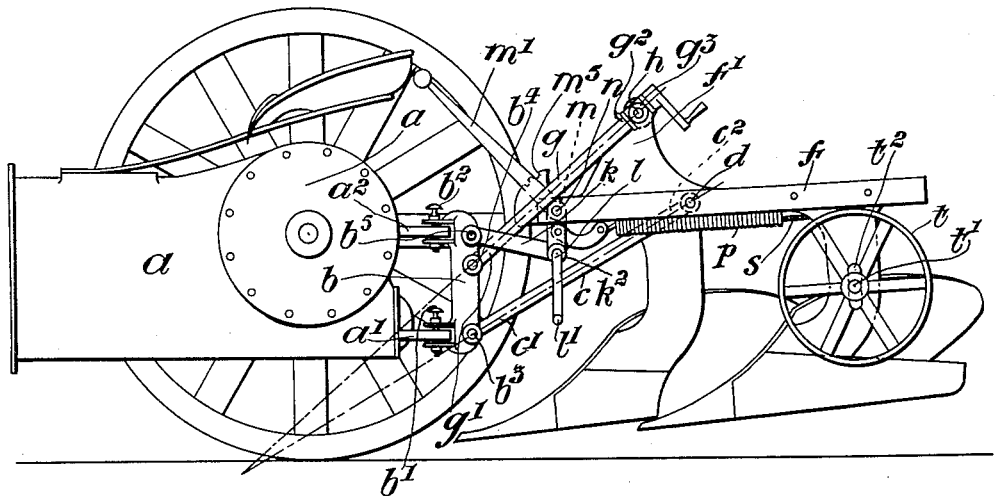
Fig. 2.
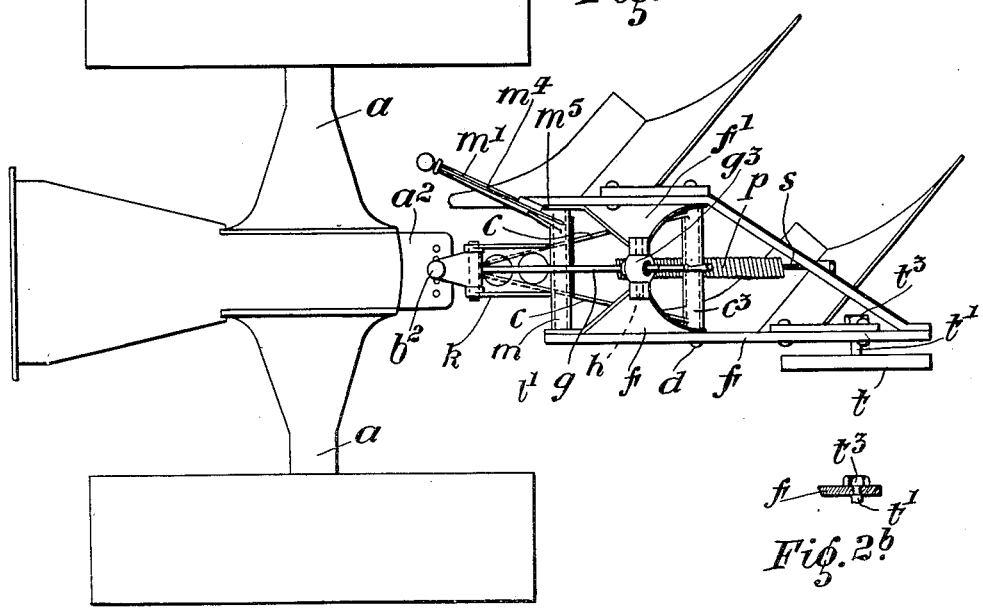
Fig. 2b.
Inventor:
Harry Ferguson,
By
Wiederhein Fairbanks
Attorneys.

July 15, 1924.
H. FERGUSON
AGRICULTURAL IMPLEMENT
Filed May 4, 1922     2 Sheets-Sheet 2
1,501,651
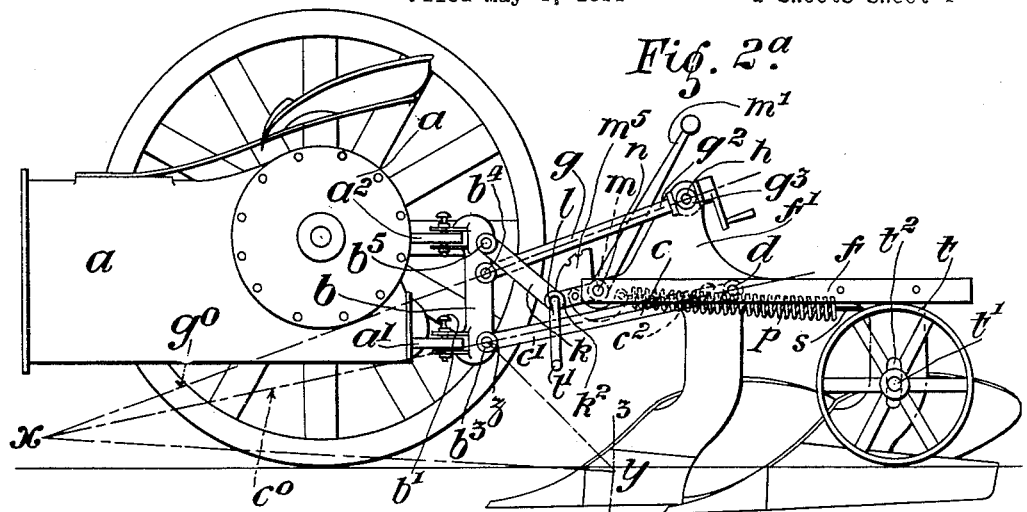
Fig. 2ª
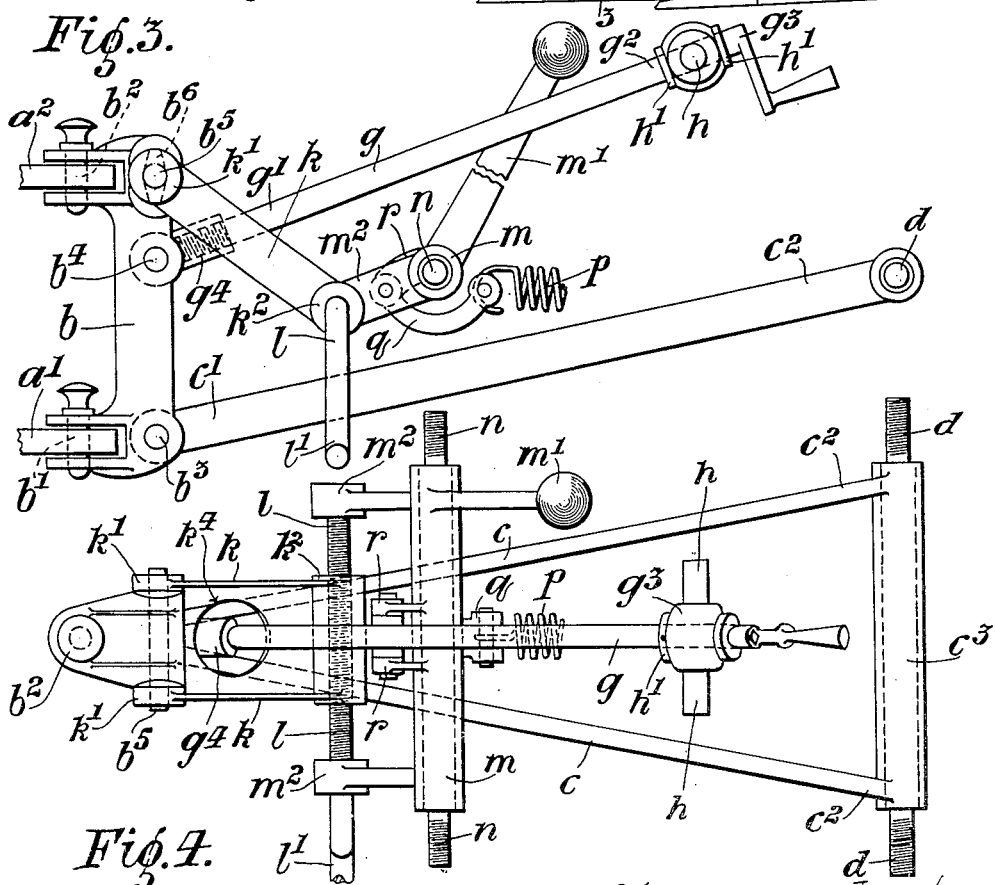
Fig. 3.
Fig. 4.
Inventor: Harry Ferguson

Patented July 15, 1924.

UNITED STATES PATENT OFFICE.

HARRY FERGUSON, OF BELFAST, IRELAND.

AGRICULTURAL IMPLEMENT.

Application filed May 4, 1922. Serial No. 558,468.

*To all whom it may concern:*

Be it known that I, HARRY FERGUSON, of 83 May Street, Belfast, Ireland, a subject of the King of Great Britain and Ireland, have invented certain new and useful Improvements Relating to Agricultural Implements, of which the following is a specification.

This invention relates to agricultural implements adapted to be drawn by tractors, and of the kind having means as set forth in the specification of my prior Patent No. 1,464,130 for closely hitching the implement to the tractor.

Said hitching means comprises upper and lower members movably connected to the tractor and to the implement so as to permit free relative movement between the tractor and implement when in operation, said members being arranged so as to cause the effective line of draft to be from a position other than the actual connection between the tractor and the implement.

The present invention consists of an implement having, in combination with said hitching means, means adapted to bear on the ground so as to regulate the depth of cut of the soil engaging parts of the implement in accordance with the contour of the ground. Preferably the depth regulating means is a wheel adjustably secured to the implement frame and arranged, in the case of a plough for example, at the rear of the plough in such position as to bear on the ground during ploughing so as, in conjunction with the hitching means, to maintain the plough shares at the proper working depth in relation to the surface of the ground.

The adjustable wheel also serves to expedite the entry of the plough shares into the ground when the implement is lowered to its working position and in this respect counter-balances any sluggishness of entry which may arise from the almost parallel movement of the implement frame obtained with a link connection or hitch as aforesaid.

Although a depth adjusting wheel is not novel per se it is novel when used in combination with my aforesaid hitching means for the purpose stated.

The depth regulating means may, if desired, consist of a skid instead of a wheel.

The invention will now be described with reference to the accompanying drawings, whereon I have shown, by way of illustration or example, one construction of the new connection, suitable for a tractor and plough.

Fig. 1 is a side elevation of the plough and its connection to the tractor.

Fig. 2 is a plan view corresponding to Fig. 1.

Fig. 2ª shows the plough, Fig. 1, lowered into the ground.

Fig. 2ᵇ is a detail showing the manner of mounting the depth regulating means.

Fig. 3 is a detailed view of the link mechanism and controls.

Fig. 4 is a plan view corresponding to Fig. 3.

Referring to the drawings, $a$ is the tractor, $a^1$ is the draw bar, and $a^2$ is an abutment. $b$ is a swivelling member which is attached to the draw bar $a^1$, and the abutment $a^2$, by pins $b^1$ and $b^2$. The member $b$ is provided with a loose pin joint, or a ball joint, $b^3$, to which one end $c^1$ of a double link $c$ is connected. The other end $c^2$ of the link $c$ is attached by a cross shaft $d$ to the plough frame $f$, the shaft $d$ being turnable in the sleeve $c^3$ at the end of $c^2$ of the link $c$. The member $b$ is also provided with a pin $b^4$ to which one end $g^1$ of a link $g$ is pivotally connected. The end $g^2$ of the link $g$ passes through and is free to turn in a boss $g^3$ having pins $h$ carried revolubly in brackets $f^1$ projecting from the top of the plough frame.

Above the connection $b^4$ another pin $b^5$ is carried in a vertically slotted hole $b^6$ in the member $b$. This pin $b^5$ is connected with the ends $k^1$ of a rockable member $k$, having an internally screw threaded sleeve $k^2$ at its other end which engages a screw threaded spindle $l$ supported in arms $m^2$, $m^2$, from a sleeve $m$, which, in turn, is supported by a spindle $n$ secured to, and supported by, the plough frame. A hand lever $m^1$ is rigidly secured at one end of the sleeve $m$, and, by means of said lever, the sleeve $m$ can be turned on the spindle $n$ for the purpose of raising or lowering the plough. The screw threaded spindle $l$ is provided with an operating handle $l^1$, whereby it can be turned. By turning the handle $l^1$, and screw spindle $l$ the plough frame $f$ can be moved laterally relatively to the rockable member $k$, whose pin connection $b^5$ is free to rock or tilt in the slotted hole $b^6$, so that the member $k$ may keep its proper angular relationship to the plough frame $f$. The plough frame with the link $c$ can tilt or rock slightly owing to the loose joint $b^3$. $k^4$ is a hole in the member $k$ through which the link $g$ can pass.

I provide a spring $p$, connected, at one end, to a link $q$, which is secured to arms $r$ projecting from the sleeve $m$, and, at its other end, is adjustably connected with the plough frame through the medium of a screw $s$. The function of this spring will be hereinafter explained.

In the example shown, (Fig. 3) provision is made for altering the effective length of the link $g$ for the purpose of altering the depth of cut of the plough when so desired. For this purpose the link $g$ is screw threaded at its one end $g^1$ and enters a screw threaded socket $g^4$ connected with the pin $b^4$. The other end of the link $g$ passes the boss $g^3$ and has collars $h^1$ at each side of said boss and is formed into a handle whereby it can be turned for the purpose of lengthening or shortening it by screwing it into, or out of, the socket $g^4$.

Fig. 1 shows the plough lifted above the ground, and Fig. 2ª shows the plough when lowered into the ground by moving the lever $m^1$ backward in the direction of the arrow, Fig. 1. When the lever $m^1$ is moved in this manner it turns the sleeve $m$ and arms $m^2$ thereby straightening out the linkage $m^2$, $k$, and forcing the plough frame backwards and downwards which it readily does owing to the weight of the plough. At the same time the action of the link $q$ extends the spring $p$ and puts it under tension, the re-action of the spring being utilized subsequently to assist in lifting the plough when required, which operation would otherwise require a greater effort owing to the weight of the plough. The spring $p$ can be normally tensioned, as desired, by means of the screw $s$. The plough is held in the raised position by the usual spring catch $m^4$ and notched guard $m^5$.

As will be seen from Fig. 1 and also Fig. 2ª the links $g$ and $c$ are not parallel but diverge slightly from the points of attachment to the member $b$, also the lower link $c$, is longer than the upper link $g$.

As will be seen from Fig. 2ª the lines $g^0$, $c^0$, drawn through the links $g$, $c$, intersect at a point $x$ which is in advance of the axle of the back wheels of the tractor and below the level of the hitch point $b^3$. The arrangement and action of the links is such that the draft of the plough, instead of being along a line from $b^3$ to $y$, which is unfavourable, is effected as if it were along the line $x$—$y$ which, being close to the ground, is a most favourable line of draft.

The point from which the line of draft extends continually changes as relative up and down movement takes place between the implement and the tractor but the soil engaging part of the implement (in the case of a plough, the share) is constrained to follow a curve which, in the plough shown at Fig. 2ª, approximates to the arc of a true circle whose centre is at the point $x$ so that the line of draft is from a point other than the actual hitch point. In Fig. 2ª the dotted line 3—3 indicates the aforesaid curve. It may be explained that the links $g$, $c$, are so disposed, in the example shown, that the bisecting point of the lines $g^0$, $c^0$, will be at $x$.

The plough is kept at an even depth of cut and the plough shares are enabled to follow the contour of the ground by providing a wheel $t$ or equivalent ground bearing means preferably arranged at the rear of the plough in such a position as to bear on the ground during ploughing and thereby maintain the plough shares at the proper depth in relation to the surface of the ground. The wheel $t$ is shown mounted on a shaft $t^1$ extending through a vertical slot $t^2$ in the plough frame and adjustably secured therein by a clamping nut $t^3$ screwthreaded on the end of the shaft.

If desired the wheel $t$ may be replaced by a skid which would have practically the same effect, the only difference being that the wheel has less frictional resistance in passing over the ground.

In operation the connection acts as follows:—

The forward pull of the tractor tends to pull the member $c$ downwards (about $b^3$) to the horizontal thereby effecting a downward thrust on the plough and holding it down to its work whilst the pull of the tractor also causes a rearward thrust by the ground on the plough shares with the result that the plough tends to swing backwards and angularly upwards, the tendency being to turn about the centre $d$. This turning movement which tends to raise the shares out of the ground causes the link $g$ to thrust on the member $b$ and the abutment $a^2$ which thrust is countered and resisted by the tractor. In all normal circumstances, even with a light weight "Fordson" tractor, the combined action is sufficient to hold the plough down to its work so that the ploughing is effective and, as regulated by the wheel $t$, at a uniform depth. In some cases, as, when the plough strikes an obstruction, such as a boulder or the like, the re-action on the link connection is so great that actually the back of the tractor is raised slightly off the ground with the result that the back wheels skid or spin and in this manner relieve the stress, thereby preventing breakage of the connection.

It will be seen from the foregoing that the link $g$ acts as a compression member while the link $c$ acts as a tension member. The arrangement and disposition of these members, while permitting the plough freedom of up and down movement and to be easily raised and lowered by the hand lever $m^1$, positively prevents the plough turning upwards of itself out of the ground even although the shares are subjected to great stress. When the plough is raised up it remains in position on the rear of the tractor and forms part thereof being supported by the links $c$, $g$, and $k$, and held by the locked lever $m^1$.

By turning the link $g$ its effective length can be increased or decreased and thereby lift or lower the plough slightly.

When the plough is in operation in the ground the spring $p$ is under tension and exerts a downward pull on the arms $r$ and thereby tends to raise the plough. When ploughing at about the depth illustrated in Fig. 2ª the tendency to lift the plough is very slight because owing to the position of the arms $r$ (see Fig. 3) the leverage is very small so that the spring is practically ineffective. However, as the operator turns the hand lever $m^1$ in the direction of the arrow to raise the plough, the arms $r$ to which the spring is connected by means of the link $q$ move downwards and the tensioned spring then acts with a gradually increasing leverage and becomes of practical assistance to the operator in lifting the plough.

When ploughing at greater depth the arms $r$ will be in such a position that the pull of the spring passes through the axis of the shaft $n$ and is then wholly ineffective so that it has no tendency whatever to raise the plough. Again, when ploughing at even greater depth the arms $r$ move upwards to the left of the shaft $n$ past the dead centre and the spring then actually has a tendency to keep the plough down in the ground. Of course, when, by moving the hand lever $m^1$, the arms $r$ are brought below the dead centre the spring acts as before stated with a gradually increasing leverage to assist the operator in raising the plough.

In Fig. 2ª the lever $m^1$ is moved so as to be free of the quadrant and therefore allow the implement freedom for up and down movement.

It will be clear from Fig. 2ª that the lever $m^1$, being free of the quadrant $m^5$, the plough has freedom of up and down movement. Should the tractor be travelling over wavy ground, the wheel $t$ will follow the contour of the ground and keep the plough shares at a regular depth of cut. Of course, it will be understood that there will always be a certain amount of irregularity owing to the distance of the wheel $t$ from the share point, but this is negligible for all practical purposes.

In some cases, the links may be directly connected to the tractor, universal joints being used.

Having now fully described my invention what I claim and desire to secure by Letters Patent is:—

1. The combination with means for hitching an agricultural implement to a tractor, comprising upper and lower members movably connected to the tractor and to the implement so as to permit free relative movement therebetween during operation, said members being arranged so as to cause the effective line of draft to be from a position other than that of the actual connection between the tractor and the implement, of means on the implement adapted to bear on the ground and regulate the working depth of the soil engaging parts of the implement.

2. The combination with means for hitching an agricultural implement to a tractor, comprising upper and lower members movably connected to the tractor and to the implement so as to permit free relative movement therebetween during operation, said members being arranged so as to cause the effective line of draft to be from a position other than that of the actual connection between the tractor and the implement, of a wheel adjustably carried on the implement frame and adapted to bear on the ground so as, in conjunction with the hitching means, to maintain the soil engaging parts of the implement at the proper working depth in relation to the surface of the ground.

3. An agricultural implement having a coupling comprising an upper and a lower element adapted to be movably secured to a tractor, the upper element being pressure resisting, said coupling permitting the implement to move freely up and down when being drawn by the tractor, and the parts thereof being so arranged that the effective line of draft is below said coupling, the implement being also provided with means adapted to bear on the ground for the purpose of regulating the working depth of the soil engaging parts of the implement.

In testimony whereof I affix my signature in presence of two witnesses.

HARRY FERGUSON.

Witnesses:
 ANDREW HAMILTON,
 HARRY WALTER ALLSOP.